UNITED STATES PATENT OFFICE.

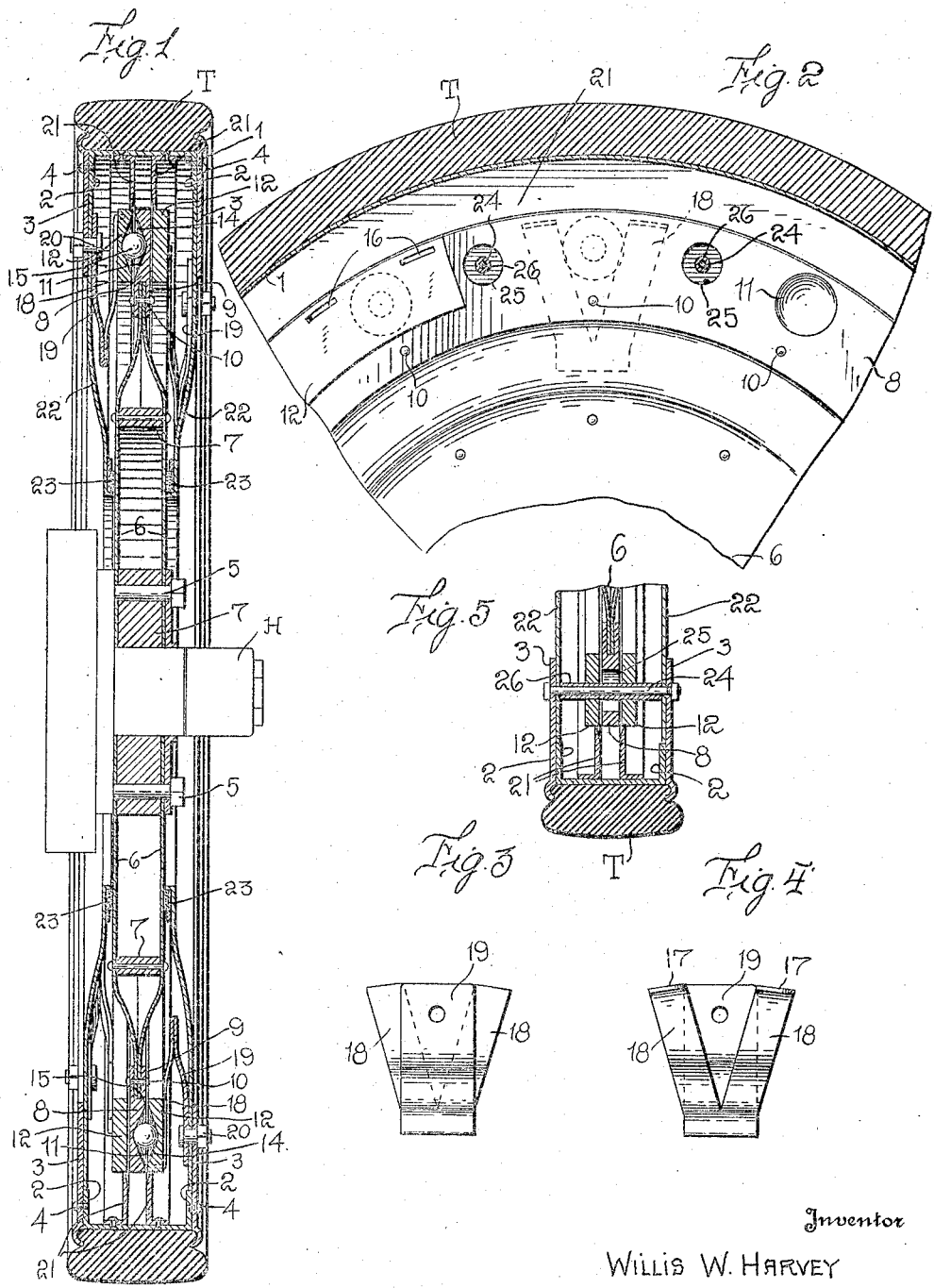

WILLIS W. HARVEY, OF MALAD CITY, IDAHO.

RESILIENT WHEEL.

1,276,061.

Specification of Letters Patent.

Patented Aug. 20, 1918.

Application filed December 3, 1917. Serial No. 205,079.

*To all whom it may concern:*

Be it known that I, WILLIS W. HARVEY, a citizen of the United States, residing at Malad City, in the county of Oneida and State of Idaho, have invented certain new and useful Improvements in Resilient Wheels, of which the following is a specification.

This invention relates to certain improvements in resilient wheels and it is an object of the invention to provide a device of this general character having novel and improved means to compensate for the shocks and jars incident to the travel of the wheel.

The invention also has for an object to provide a device of this general character with novel and improved means whereby the tread portion of the wheel is capable of limited movement relative to the hub when the wheel is under load.

The invention consists in the details of construction and in the combination and arrangement of the several parts of my improved resilient wheel wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein:

Figure 1 is a sectional view taken through a wheel constructed in accordance with an embodiment of my invention;

Fig. 2 is a fragmentary view partly in side elevation and partly in section of my improved wheel as herein embodied;

Fig. 3 is a view in side elevation of a spring member as employed in my present invention;

Fig. 4 is a view in elevation of the side of the spring member opposite to that shown in Fig. 3, and Fig. 5 is a fragmentary sectional view illustrating one of the supporting members for the outer annular members as herein included.

As disclosed in the accompanying drawings 1 denotes the rim of my improved wheel and having its side marginal portions provided with the inwardly directed annular flanges 2. Mounted upon the rim 1 is the tire T which is held in applied position upon the rim 1 by the annular clencher plates 3 detachably held to the flanges 2 by the bolts 4 or the like.

H denotes a hub of any ordinary or preferred construction and which has suitably secured thereto as indicated at 5, the disks 6 arranged in predetermined spaced relation with their marginal portions in contact. Disposed between the disks 6 are the spacing blocks 7 for a purpose which is believed to be self evident.

8 denotes an annular member concentric to the disks 7 and which has its internal face or edge provided with a continuous groove 9 disposed circumferentially therearound and which snugly receives the contracting peripheral portion of the disks 6. Disposed through the interlocking marginal portions of the annular member 8 and the disks 6 are the holding members 10 herein disclosed as rivets whereby the annular member 8 and the disks 6 are maintained in assembled relation.

The opposite faces of the annular member 8 are provided with a series of circumferentially spaced concavities or recesses 11, the recesses in one face of the annular member 8 being in staggered relation to the recesses or concavities in the opposite faces of the annular member 8.

Overlying the opposite faces of the annular member 8 are the annular members 12 and each of said members 12 is provided in its inner face with a concavity or recess 14 in registry with each of the recesses or concavities 11 in the annular member 8. Seated within each pair of registering concavities or recesses 11 and 14 is a spherical member 15 which has rolling contact with the walls of said recesses or concavities whereby it will be perceived that the annular member 8 and the annular members 12 are capable of relative independent movement.

The outer faces of each of the members 12 adjacent each of the concavities or recesses 14 is provided with a pair of recesses 16 circumferentially spaced and arranged at opposite sides of said recess or concavity 14. Extending within said recesses 16 are the angular extremities 17 of the diverging resilient arms 18 integrally formed with and overlying the spring plate 19. The plate 19 is suitably anchored as indicated at 20 to the inner marginal portion of the adjacent clencher plate 3. The spring plate 19 together with the resilient arms 18 serve to constantly urge the annular members 12 inwardly toward the annular member 8 and during the travel of the wheel the vibration imposed upon the rim 1 will result in a movement of the annular member 8 independently of the annular member 12 but the shocks and jars incident to said vibration will be substantially entirely absorbed by the spring plates 19 of the resilient arms 18 on account of the lateral movement of the members 12 relative to the member 8.

At substantially its transverse center the rim 1 is provided with a pair of inwardly directed and transversely spaced annular plates 21 and between which the annular member 8 will be held against lateral movement when the wheel is under load.

Suitably supported by the inner marginal portions of the clencher plates 3 are the annular flanges or aprons 22 and the inner marginal portions of said flanges or aprons 22 are provided with the gaskets 23 in contact with the outer faces of the disks 6 so that dirt and other foreign substances are prevented from interfering with the successful functioning of the various parts of my improved wheel.

Connecting the clencher plates 3 and the flanges or aprons 2 are a plurality of circumferentially spaced bolts 24 which are loosely disposed through the annular members 12 and through enlarged openings 25 suitably produced in the annular member 8. The bolts 24 support the annular members 12 and which members are capable of lateral movement upon said bolts. While not essential, I have found it of advantage to surround the bolts 24 with the sleeves 26 positioned intermediate the aprons 22 as particularly illustrated in Fig. 5 of the accompanying drawings.

From the foregoing description, it is thought to be obvious that a resilient wheel constructed in accordance with my invention is particularly well adapted for use by reason of the convenience and facility with which it may be assembled and operated and it will also be obvious that my invention is susceptible of some changes and modifications without departing from the principles and spirit thereof and for this reason I do not wish to be understood as limiting myself to the precise arrangement and formation of the several parts herein shown in carrying out my invention in practice except as hereinafter claimed.

I claim:

1. A resilient wheel comprising a central portion provided in its outer margin with a plurality of circumferentially spaced recesses in opposite faces thereof, annular members positioned at opposite sides of the central portion and provided with recesses adapted to register with the recesses of the central portion, members seated within said registering recesses and adapted for rolling contact with the walls thereof, a rim disposed around the central portion and the annular members and spaced therefrom and concentric thereto when free of load, the marginal portions of the rim being provided with inwardly directed flanges, inwardly directed spring plates secured to said flanges, the inner end of each of said plates being provided with reversely directed resilient arms, the extremities of said arms being engaged with the annular members, said plates and arms serving to constantly urge the annular members inwardly.

2. A resilient wheel comprising a central portion provided in its outer margin with a plurality of circumferentially spaced recesses in opposite faces thereof, annular members positioned at opposite sides of the central portion and provided with recesses adapted to register with the recesses of the central portion, members seated within said registering recesses and adapted for rolling contact with the walls thereof, a rim disposed around the central portion and the annular members and spaced therefrom and concentric thereto when free of load, the marginal portions of the rim being provided with inwardly directed flanges, spring plates secured to said flanges, said plates being provided with inwardly directed resilient arms, the extremities of said arms being engaged with the annular members, said plates and arms serving to constantly urge the annular members inwardly, the resilient arms of each plate being arranged in divergence, the outer end portions of the arms being inwardly directed, the adjacent annular member at opposite sides of a recess therein being provided with recesses to receive the inwardly directed end portions of the arms.

In testimony whereof I affix my signature in the presence of two witnesses.

WILLIS W. HARVEY.

Witnesses:
 Geo. S. Harnem,
 Harvey W. Brown.

Copies of this patent may be obtained for five cents each, by addressing the "Commissioner of Patents, Washington, D. C."